(12) United States Patent
Maggiari et al.

(10) Patent No.: US 9,319,131 B2
(45) Date of Patent: Apr. 19, 2016

(54) ADDING NEW ALTERNATIVE PATHS FOR RESTORATION IN WSON NETWORK

(75) Inventors: Massimiliano Maggiari, Genoa (IT); Michela Bevilacqua, Genoa (IT); Carla Marcenaro, Genoa (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 185 days.

(21) Appl. No.: 14/344,007

(22) PCT Filed: Sep. 29, 2011

(86) PCT No.: PCT/EP2011/067025
§ 371 (c)(1),
(2), (4) Date: Sep. 18, 2014

(87) PCT Pub. No.: WO2013/044967
PCT Pub. Date: Apr. 4, 2013

(65) Prior Publication Data
US 2015/0016815 A1      Jan. 15, 2015

(51) Int. Cl.
*H04B 10/032* (2013.01)
*H04J 14/02* (2006.01)
*H04Q 11/00* (2006.01)

(52) U.S. Cl.
CPC .......... *H04B 10/032* (2013.01); *H04J 14/0287* (2013.01); *H04Q 11/0005* (2013.01); *H04Q 2011/0043* (2013.01)

(58) Field of Classification Search
CPC .................................................... H04B 10/032
See application file for complete search history.

(56) References Cited

U.S. PATENT DOCUMENTS

| | | | |
|---|---|---|---|
| 6,215,763 | B1 | 4/2001 | Doshi et al. |
| 2002/0191247 | A1 | 12/2002 | Lu et al. |
| 2003/0185148 | A1 | 10/2003 | Shinomiya et al. |
| 2004/0218525 | A1* | 11/2004 | Elie-Dit-Cosaque et al. ............ H04L 41/0631 370/223 |
| 2010/0118696 | A1* | 5/2010 | Tanuma ................. H04L 45/00 370/225 |

OTHER PUBLICATIONS

PCT International Search Report for PCT Counterpart Application No. PCT/EP2011/067025, (Jul. 20, 2012), 3 pages.

(Continued)

*Primary Examiner* — Shi K Li
(74) *Attorney, Agent, or Firm* — NDWE LLP

(57) ABSTRACT

A network management system manages preplanned alternative paths in a wavelength switched optical network for a traffic flow having a working path and two or more preplanned alternative paths from a source node to a destination node. A processing part determines if, after the fault, a number of available alternative paths for the respective traffic flow drops to a threshold. If so, a new alternative path is calculated and set up the new alternative path in the nodes, to enable one or more of the nodes to move the traffic flow onto the new alternative path in the event of further faults without waiting for input from the network management system. Thus multiple faults can be handled without the nodes needing to store details of so many such alternative paths. Otherwise, many such alternative paths are needed to take account of many different possible failure locations.

25 Claims, 13 Drawing Sheets

(56) References Cited

OTHER PUBLICATIONS

"Interfaces for the Optical Transport Network (OTN)", *Recommendation ITU-T G.709/Y.1331, Amendment 2, Series G: Transmission Systems and Media, Digital Systems and Networks, Digital terminal equipments—General, Series Y: Global Information Infrastructure, Internet Protocol Aspects and Next-Generation Networ*, http://www.itu.int/rec/T-REC-G.709/, (Apr. 2011), 30 pages.

Berger, L., "Generalized Multi-Protocol Label Switching (GMPLS) Signaling Functional Description", *Network Working Group, Request for Comments: 3471, The Internet Society*, http://tools.ietf.org/html/rfc3471, (Jan. 2003), 35 pages.

Papadimitriou, D., et al., "Generalized Multi-Protocol Label Switching (GMPLS) Signaling Extensions for G.709 Optical Transport Networks Control", *Network Working Group Request for Comments: 4328, The Internet Society (2006)*, (Jan. 2006), 23 pages.

\* cited by examiner

ADDING NEW ALTERNATIVE PATHS FOR RESTORATION IN WSON NETWORK

CROSS-REFERENCE TO RELATED APPLICATIONS

This application is a National stage of International Application No. PCT/EP2011/067025, filed Sep. 29, 2011, which is hereby incorporated by reference.

FIELD

The present invention relates to network management systems for wavelength switched optical networks, to methods of managing such optical networks, and to corresponding computer programs.

BACKGROUND

A Wavelength Switched Optical Network (WSON) supports end-to-end optical paths, between nodes requiring connection in the network. Intermediate nodes in this type of network support wavelength switching and may also support wavelength conversion. In contrast with point-to-point optical communication links which provide high-capacity transport, always between the same pair of nodes, a WSON supports the setting up and tearing down of paths between pairs of nodes of a network having a more complex topology, such as a ring, interconnected rings or mesh topology. A Routing and Wavelength Assignment (RWA) function is typically carried out by a path computation element PCE of the WSON and involves routing a path across the WSON and assigning a wavelength to the path.

WSON is a standardization effort of the Internet Engineering Task Force (IETF). WSON is the application of a GMPLS based control plane and PCE to an "all optical" network, that is, no electrical switching is part of the WSON scope. The state of the art was a network landscape based on multi-degree ROADMs with the ability to switch (for recovery purposes) in few minutes on alternative paths defined in a planning phase.

For any restoration to use an alternative path to avoid a fault, two options are in theory on the table: Pre-Planned (PP) and On-The-Fly (OTF). In the PP option, computation of the alternate path is performed before service delivery, therefore the computation is not time-critical: this allows long and fully accurate computations to be performed, important when considering optical impairments which limit the length of paths. The computation not being time-critical allows its execution in an off-line dedicated computation element, with fully detailed network information. Computation may be performed together with network design, including hardware equipment requirement definition: this is needed if paths require regeneration. Once computed, the recovery path is reserved in the network. This has two main advantages: recovery resources cannot be "stolen" by any other user and path computation time does not affect recovery time.

In the OTF option, computation is time-critical, as its time adds to the restoration time: this requires computation and information to be summarized. Time-criticality also recommends the computation to be performed close to the network, to avoid communication overhead: for this reason, OTF path computation is normally performed in a distributed environment in the network nodes, with summarized information and limited visibility, which may also lead to resource conflict.

Typically network operators see the OTF as enabling reduced CAPEX compared to implementing PP restoration for multiple faults since PP requires so much spare capacity to be installed and reserved. Nevertheless, currently for GMPLS controlled wavelength switched optical networks, pre-planned protection paths are still preferred because the chance is too high that an OTF computation will fail to find any alternative path. This is because of the need for wavelength continuity and the limitations of optical reach, since it is too expensive to have wavelength conversion or optical regeneration throughout the network.

Two known types of PP recovery schemes for optical networks are Safe-OSNCP and Transponder Sharing Protection (TSP). Safe-OSNCP is based on a classical OSNCP, with an extra preplanned path. There is a working path which uses a first set of transponders at the source and destination nodes for conversion between electrical and optical domains. A first preplanned alternative path uses different transponders and a different route through the nodes. Electrical switches are provided to move the traffic flow onto the alternative path if needed. The extra preplanned path uses the same transponders as the first alternative path and ensures there is protection after a second fault.

Transponder sharing protection has only the working path and a set of two or more preplanned alternative paths which can protect to multiple faults. The pre-planned paths are not signaled on the WSON network, they are in an "idle" state and stored in the NEs.

WSON evolution towards On-The-Fly can be regarded as a substitute for the Transponder Sharing protection: only the worker path is active on the NEs and when a failure occurs, the NMS calculates a new route, deletes the current route and activates the new one on the NEs. In practice the new route is sent only to the source node, not to all the nodes. The Safe-ONSCP and TSP schemas are "static" and, especially for TSP, resource consuming as the NE has to store a lot of information. The resource consuming problem is mitigated by the new "On the Fly" but there remains a problem in the delay before the new route can be calculated.

SUMMARY

Embodiments of the invention provide improved methods and apparatus. According to a first aspect of the invention, there is provided a network management system for managing pre-planned alternative paths in a wavelength switched optical network having a number of nodes and the network management system having an input for receiving an indication of a fault affecting a traffic flow, the traffic flow having a working path and two or more pre-planned alternative paths from a source node to a destination node. A processing part is arranged to determine if, after the fault, a number of available alternative paths for the respective traffic flow drops to a threshold, the threshold being at least one. If so, it is arranged to determine a new alternative path through the network for the respective traffic flow from the same source node to the same destination node. A path set up part is provided to communicate with the nodes along the new alternative path to set up the new alternative path in the nodes, to enable one or more of the nodes to move the traffic flow onto the new alternative path in the event of further faults without waiting for input from the network management system.

A benefit of computing further alternative paths only on demand when there are insufficient numbers of existing alternative paths available, is that multiple faults can be handled without the nodes needing to store details of so many such alternative paths. Otherwise, many such alternative paths are needed to take account of many different possible failure locations. Hence processing and storage requirements at the nodes are lowered and the scheme is more scalable. Furthermore, the resulting new alternative paths are likely to be more efficient than if the path computation is done on the fly, since there is more time for the calculation, and the calculation takes account of the first fault at least. They are also likely to be more reliable than on the fly calculated paths, since they can be used even if the NMS or communications links with the NMS are temporarily down.

Any other features can be added to this aspect, and some such additional features are described below in more detail. As one such added feature of some embodiments, the pre-planned alternative paths can be optically switched shared transponder paths or electrically switched automatic protection paths, and the determining of the number of available alternative paths involves determining a number of the protection paths which are active and not alarmed, and a number of the optically switched shared transponder paths which are not yet used. A benefit for some embodiments having these additional features is compatibility with known types of pre-planned alternative paths, though others can be used.

Another such additional feature is one of the pre-planned alternative paths making use of a different transponder at the source node to that used by the working path, and the processing part being arranged to determine whether the new alternative path shares the transponder used by the working path or shares the different transponder, so as to provide available alternative paths using two or more different transponders. A consequence is that if the pre-planned scheme reacts to a further fault by switching to a path using a different transponder, there will be an available alternative path either way. Thus providing the new alternative path on demand can provide some synergy with a traditional protection scheme.

Another such additional feature is the threshold being one. This means that two faults are always covered which is enough for most purposes.

Another such additional feature is an internal path computation element for carrying out the determining of the new alternative path. This can mean that there are fewer interfaces and so less complexity. The alternative of an external PCE can be used and has the benefits that they can each be optimized separately or located at different locations or on different hardware, and can be supplied by different suppliers for example.

The network management system can be centralized at a single location, for example on one hardware platform. The processing part and the path set up part can be implemented for example in the form of one or more program modules arranged to be run on the same computer. A benefit of a centralized system is that communications overhead can be reduced and maintenance is easier, and there is less likelihood of problems from latency of communications between parts of a distributed NMS.

The path set up part can be arranged to set up the new alternative path so that the moving of the traffic flow onto the new alternative path is left under control of the source node, by means of optical switches at nodes along the path where the new alternative path respectively diverges from, and rejoins, a path previously carrying the traffic flow. This can provide local and autonomous control of the moving in a convenient way.

The path set up part can be arranged to cause the nodes to remove an existing alternative path if it is no longer available, to free the resources reserved for that path. This can help maximize use of resources.

At least some of the nodes can have a wavelength conversion capability, and the determining of the new alternative path can involve assigning a different wavelength for some or all of the path compared to wavelengths used for the pre-planned alternative paths. This can help enable many more possible routes to be provided and so makes it easier to find alternative paths and makes more efficient use of capacity.

Another aspect of the invention provides a method of managing pre-planned alternative paths in a wavelength switched optical network having a number of nodes, involving receiving an indication of a fault affecting a traffic flow, the traffic flow having a working path and a number of pre-planned alternative paths from a source node to a destination node. It is then determined if a number of available pre-planned alternative paths for the respective traffic flow drops to a threshold, the threshold being at least one. If the threshold is reached, a new alternative path is determined through the nodes of the network for the respective traffic flow from the same source node to the same destination node. Then the new alternative path is set up in the nodes, to enable one or more of them to move the traffic flow onto the new alternative path in the event of further faults.

Any additional features can be added to this aspect. The pre-planned alternative paths can be optically switched shared transponder paths or electrically switched automatic protection paths, and a number of the protection paths which are active and not alarmed is determined, and a number of the optically switched shared transponder paths which are not yet used is determined.

At least one of the pre-planned alternative paths can make use of a different transponder at the source node to that used by the working path. The new alternative path can share the transponder used by the working path or can share the different transponder, so as to provide available alternative paths using two or more different transponders.

An external path computation element can be used to compute the new alternative path from a source node to a destination node.

The setting up step can comprise setting up the new alternative path so that the moving of the traffic flow onto the new alternative path is left under control of the source node, by means of optical switches at nodes along the path where the new alternative path respectively diverges from, and rejoins, a path previously carrying the traffic flow.

The path set up step can involve reserving resources at the nodes and setting a route status as not used. There can be a step of causing the nodes to remove an existing alternative path if it is no longer available, to free the resources reserved for that path.

Another aspect provides a computer program stored on a computer readable medium for use in a network management system and having instructions which when executed by a computer of the network management system, cause the computer to carry out the methods set out above.

Any of the additional features can be combined together and combined with any of the aspects, or can be disclaimed from any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
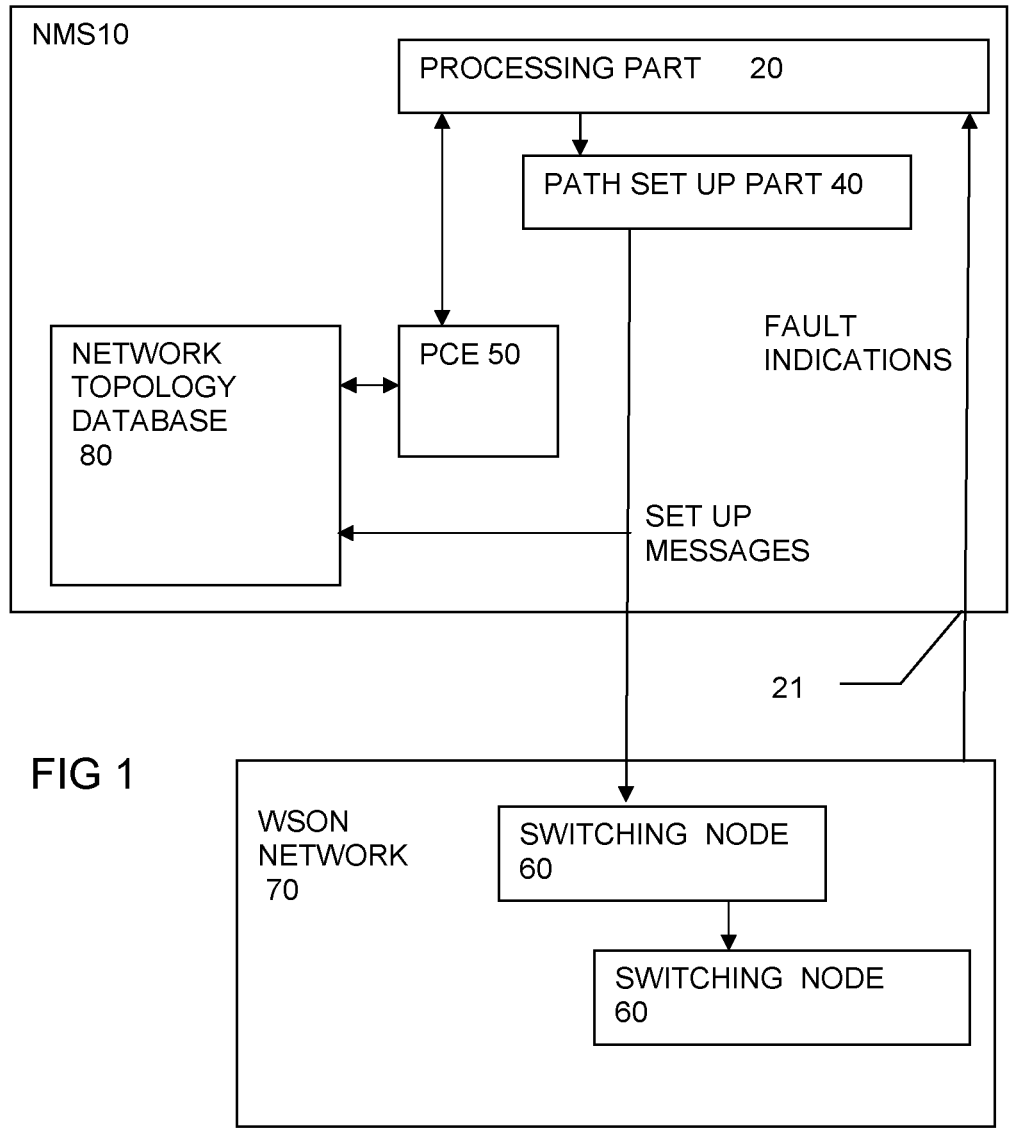
FIG. 1 shows a schematic view of an example of an NMS according to an embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Abbreviations
ASICs Application Specific Integrated Circuits
CAPEX Capital Expenditure
FPGAs Field Programmable Gate Arrays
GMPLS Generalised multiple protocol label switched
IETF Internet Engineering Task Force
LSP Label Switched Path
NE Network Element
NMS Network Management System
NR Network Reliability
ODU Optical Data Unit
OSNCP Optical Sub-Network Connection Protection
OTF On the Fly
OTN Optical Transport Network
OXC Optical Cross Connect
PCE Path Computation Engine
PP Pre-Planned
RC Resource Consumption
ROADM Reconfigurable Optical Add Drop Multiplexer/demultiplexer
RSVP Resource Reservation Protocol
RWA Routing and Wavelength Assignment
TSP Transponder Sharing protection
WSON Wavelength Switched Optical Network
WSS Wavelength Switching Section By way of introduction to the embodiments, how they address some issues with conventional designs will be explained. Thanks to the WSON control plane, recovery schemes are possible where the recovery resources are only booked. They are activated (cross-connected) only in case of failure (unidirectional of bidirectional). As a consequence, recovery resources can be shared among different working paths: this allows resource sharing in the recovery domain. Notably, in at least some embodiments, new alternative paths are found on demand, but not on the fly. This means they are pre-planned but only when the protection scheme (such as Safe-OSNCP or TSP schemes) has only one alternative path available. Then a centralized PCE located in the Network Management System (NMS) calculates a new alternative path and sends it to at least one of the nodes on the path. How the PCE calculates the path is not changed, so conventional algorithms can be used, bearing in mind that there is more time to do the calculation, since the path is calculated while there is still another available alternative path. So the calculation is off-line in the sense that the traffic is not held up and delayed by the time taken by the calculation.

Figure 2:
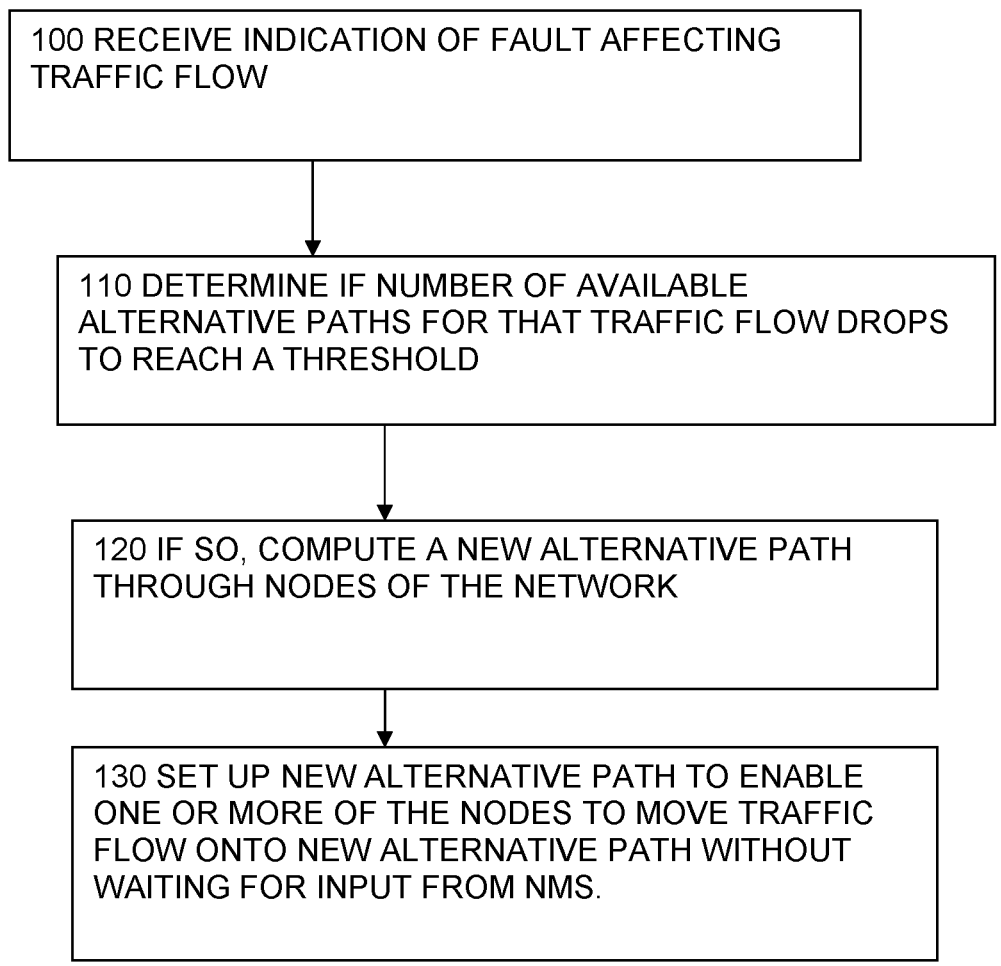
FIG. 2 shows some steps in a method of managing an optical network according to an embodiment.

FIGS. 1, 2, first embodiment

FIG. 1 shows a schematic view of an example of a network management system NMS 10 according to an embodiment for managing a WSON network 70. The NMS has a processing part 20 and a path set up part 40. The processing part 20 can receive fault indications from the network via input 21. It is coupled to a PCE 50 which can access information about the network using a network topology database 80. The processing part can send the newly calculated alternative path to the path set up part which can send messages to the nodes 60 of the network to set up the new alternative path before it is needed.

FIG. 2 shows some steps of an NMS according to an embodiment, such as the embodiment of FIG. 1. At step 100, an indication of a fault affecting a traffic flow is received. This can be any kind of indication and any kind of fault. The traffic flow typically has a working path and two or more alternative paths. It could be a fault in the working path or in principle, a fault in the alternative paths. At step 110, the NMS determines a number of alternative paths remaining available after the fault. If the number drops to reach a threshold, then at step 120 a new alternative path is computed. The threshold should be at least one, which means that, with the new alternative path, there is always two available alternative paths. Hence two faults can be handled without losing the traffic altogether. At step 130, the new path is set up by sending messages to one or more nodes of the new alternative path. In the examples described below, the messages are sent to the source node and the source node controls the setting up in other nodes and controls the moving of the traffic flow onto the new alternative path. In principle this could be carried out by the destination node or other node.

FIGS. 3-7, network views

Figure 3:
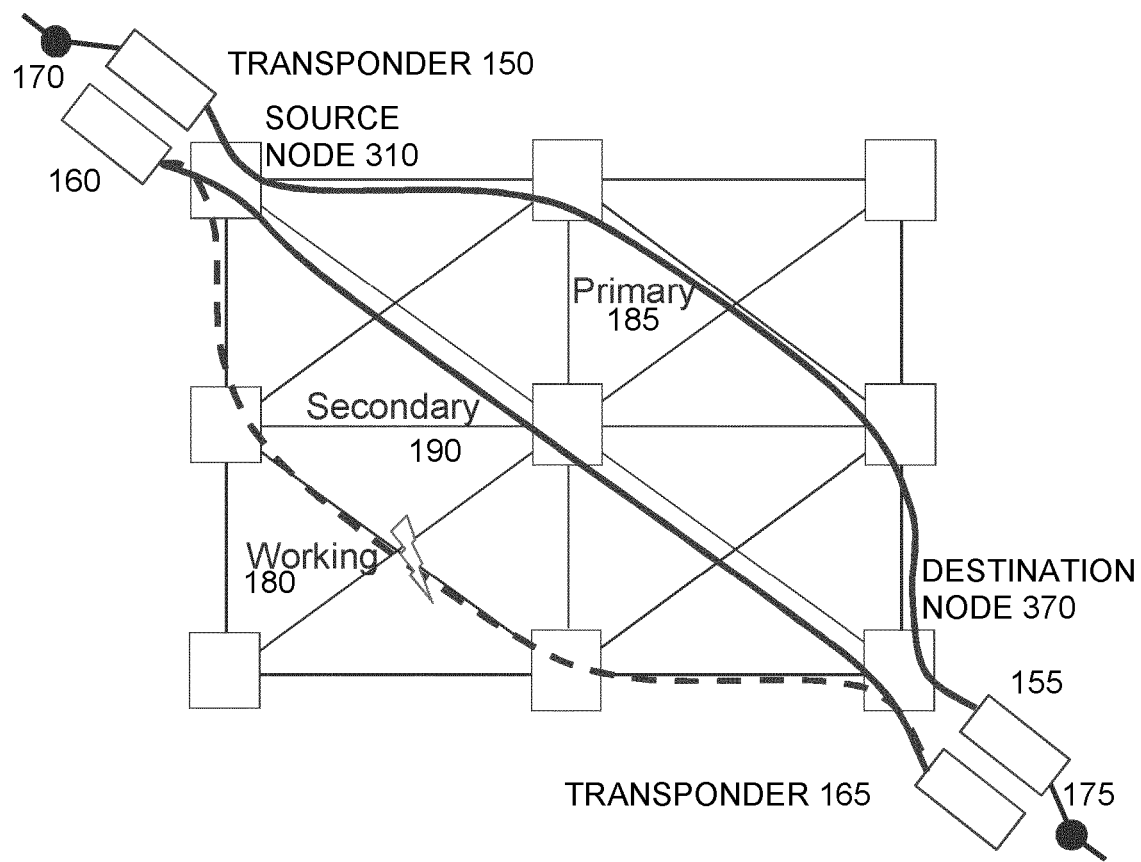
FIGS. 3 to 7 show network views of alternative paths at different times, according to embodiments.

FIGS. 3 to 6 show schematic plan views of some nodes of a network and show paths through the network at different points in time according to an embodiment. FIG. 3 shows a traffic flow from a source node 310 at top left to a destination node 370 at bottom right of the figure. Nine nodes are shown in a 3×3 grid, though in practice there could be many more in an irregular mesh: A working path 180 is set up from electrical switch 170 via transponder 150 at source node 310, via a first intermediate node shown below the source node, and via a second intermediate node shown in the middle of the bottom row of the grid. At the destination node 370, the working path uses transponder 165 and electrical switch 175. A fault is shown on this working path and so it is not available, as indicated by use of a dotted line for the path.

The scheme shown is a Safe-OSNCP scheme, so it reacts to the fault as a usual OSNCP and uses the electrical switches 170, 175 to send the traffic over the pre-planned primary alternative path 185. This passes via transponder 150 at the source node, to an intermediate node in the middle of the top row of the grid, and another intermediate node at the right end of the middle row of the grid. At the destination node it uses transponder 155. At this time there is a second preplanned alternative route 190 available, passing from transponder 160 at the source node via an intermediate node in the middle column of the middle row of the grid to transponder 155 at the destination node.

Figure 5:
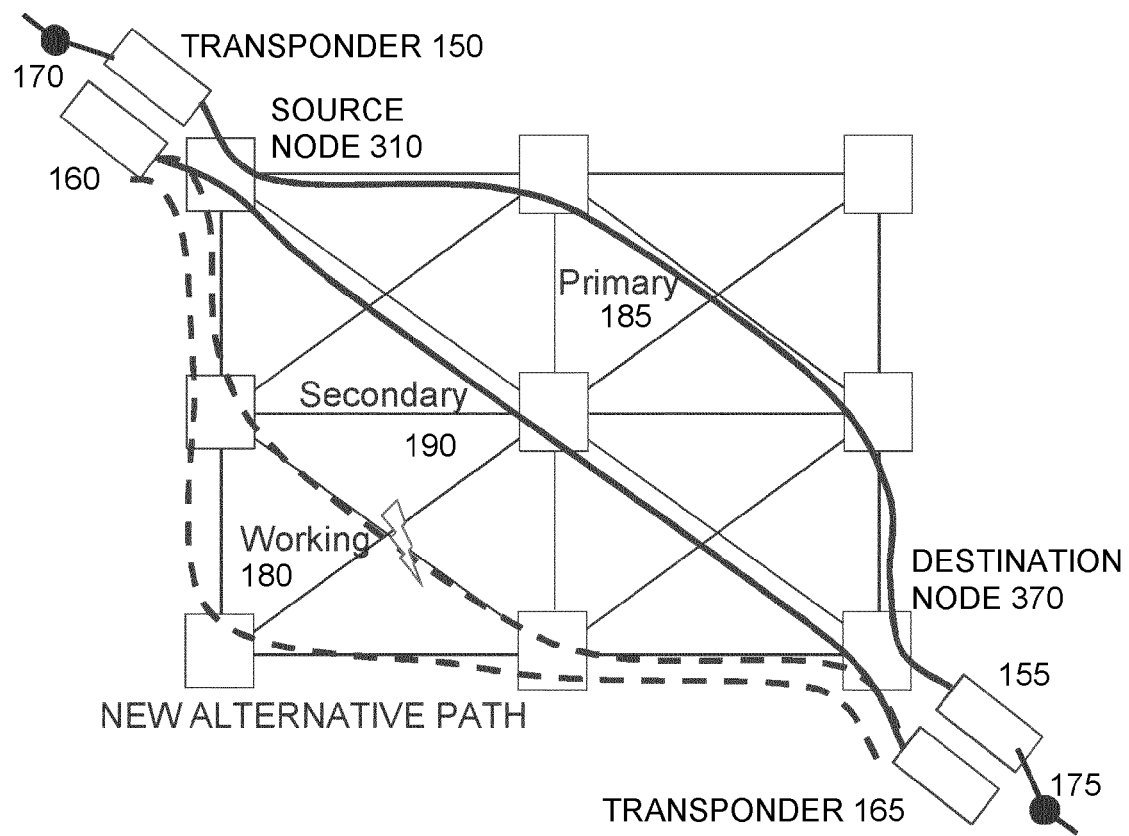
Figure 6:
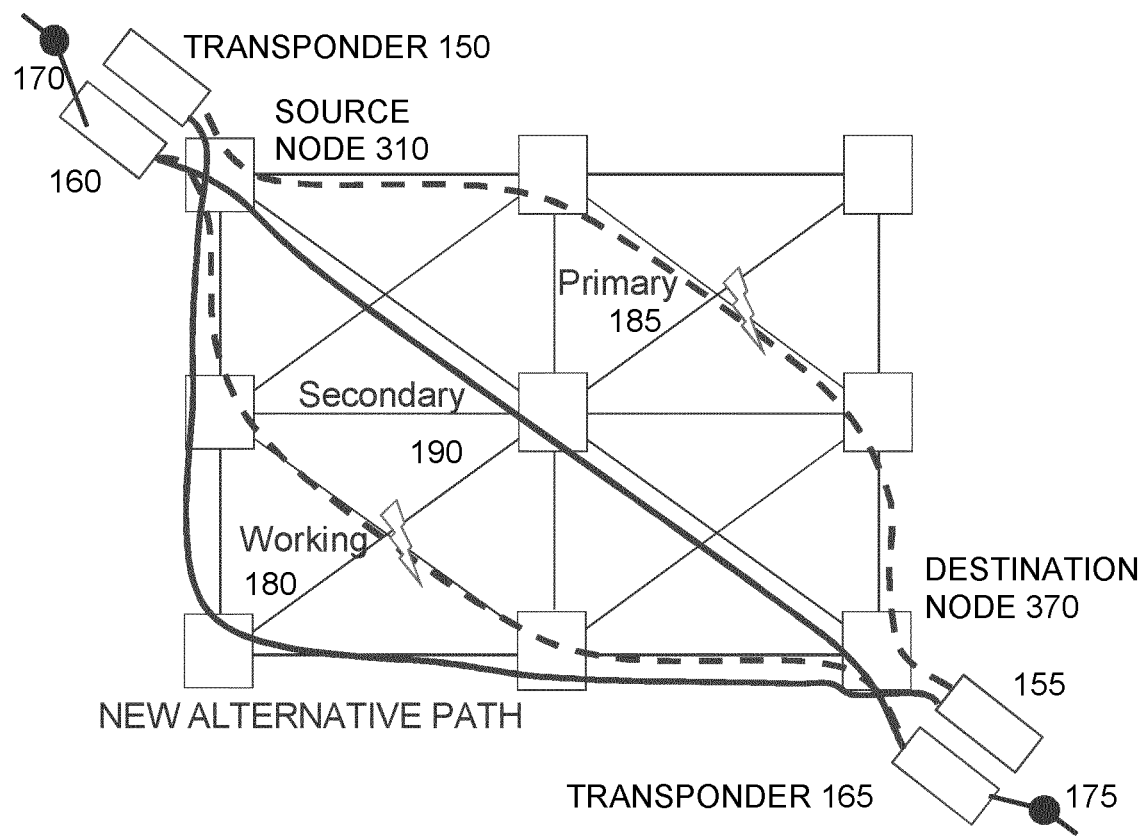

According to an embodiment, at this point in time the NMS would be determining from the fault indications that only one alternative path remains and so would be calculating and setting up another one, as shown in FIG. 5 or 6.

Figure 4:
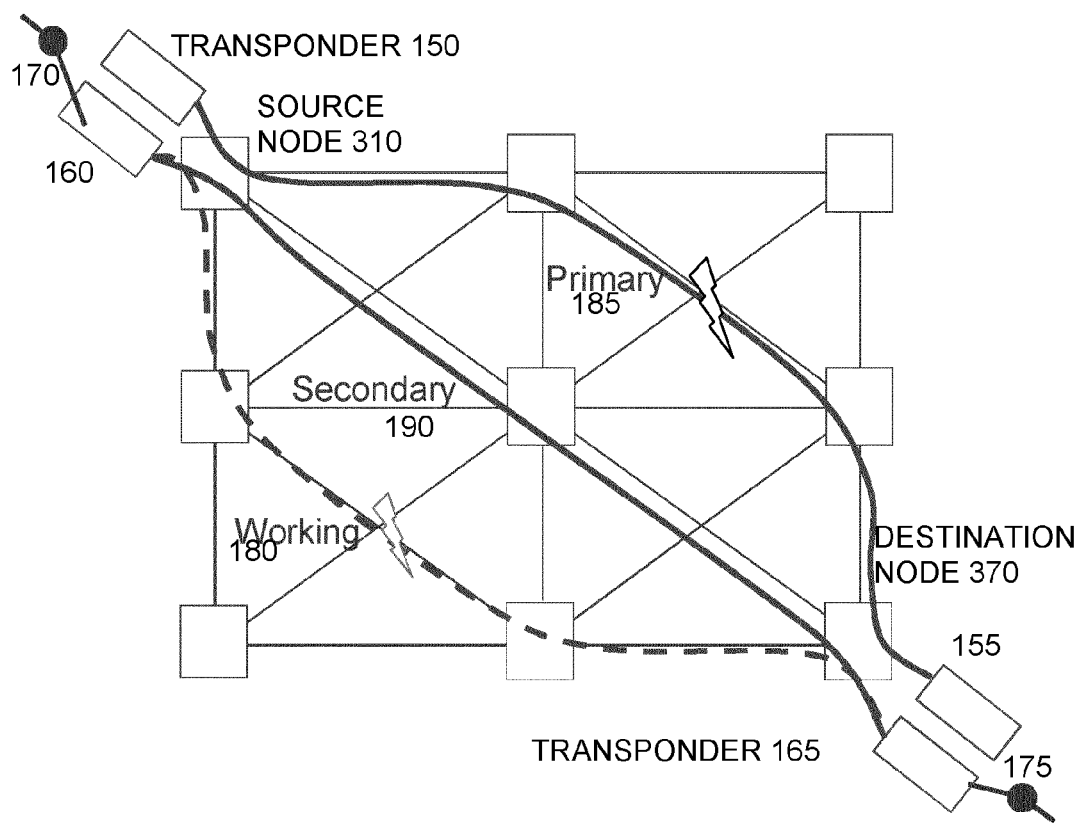

In FIG. 4 is shown the same scheme as FIG. 3, but with a fault on the primary path as well as the fault on the working path. Now the electrical switches 170 and 175 switch back to move the traffic flow onto the secondary alternative path which uses transponders 160 and 165. Now, with the current solution there are no available alternative paths any further faults could cause complete loss of the traffic flow.

FIGS. 5 and 6 show two options for the new alternative path according to embodiments of the invention. A new pre planned path is calculated by the NMS and sent to at least one of the nodes as soon as only one alternative path is available. FIG. 5 shows the new alternative path going from transponder 160 via three intermediate nodes to the transponder 165 at the destination node. As shown, the three intermediate nodes are the left-most of the middle row of the grid, the left-most of the bottom row of the grid, and the middle of the bottom row. The new available path is shown as dotted because it uses the same transponder as the secondary path 190, and so could only be used as an alternative to the secondary. FIG. 6 shows the position at a time when a fault occurs on the primary preplanned path 185. Now the traffic flow is switched to the secondary path 190. The primary pre-planned path 185 can be deactivated, as shown by it being a dotted line. The new alternate path is activated as the next alternative path to be used by coupling it to transponders 150 and 155 at the source and destination nodes respectively. This is an example of the new alternative path sharing a different transponder to that used by the working path so that the available alternative paths (secondary path 190 and the new alternative path) use two different sets of transponders. If the primary path 185 is regarded as permanently faulty, then at this point the NMS could discard it, and then detect that the number of available alternative paths is down to one and could start calculating another new alternative path.

Figure 7:
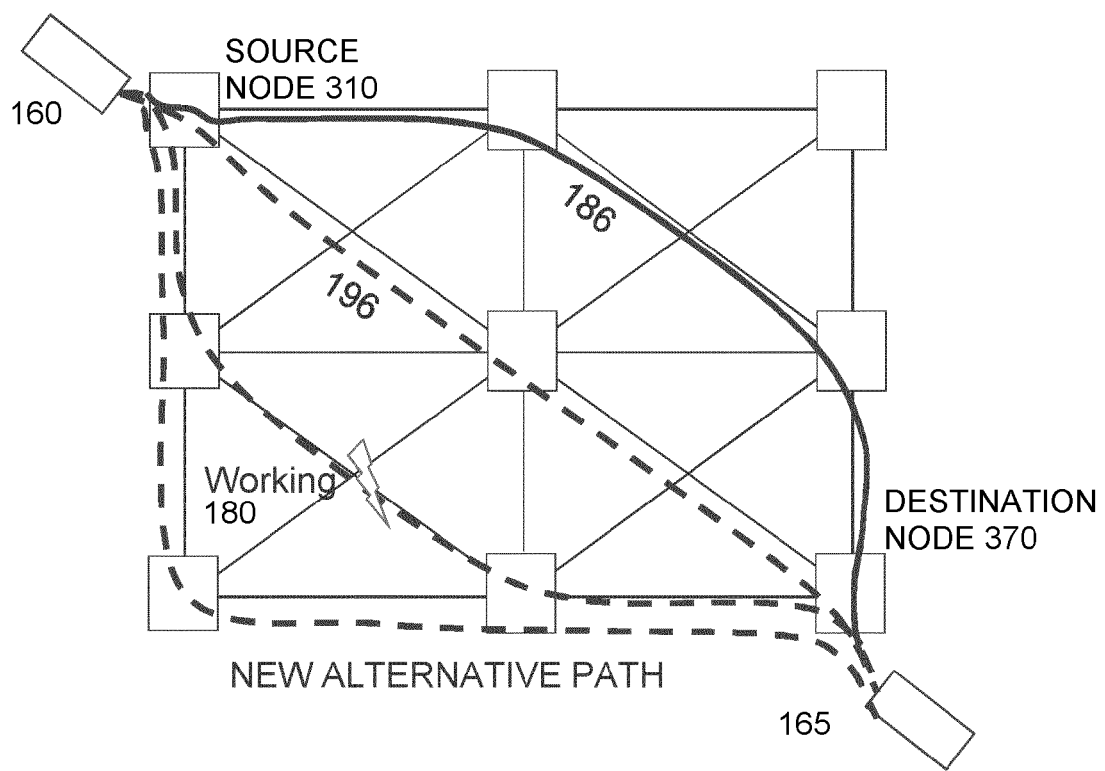

This approach can be applied each time a fault occurs as necessary, and hence the schema is able to protect for multiple faults. FIG. 7 shows a network view for an embodiment for a transponder sharing example. In this case there is a first pre-planned alternative path 186 shown as a solid line which shares the same transponders 160 and 165 as the working path 180. A second pre-planned alternative path 196 shown as a dotted line shares the same transponder as the working path. A fault is shown on the working path. This leads to the traffic being moved to path 186, which is therefore shown as a solid line, and the NMS determines that a new alternative path is needed which is set up as shown (as a dotted line), sharing the same transponders as the other paths. The set up can be by sending messages to the source node, as described in more detail below, or to other nodes in principle.

Figure 8:
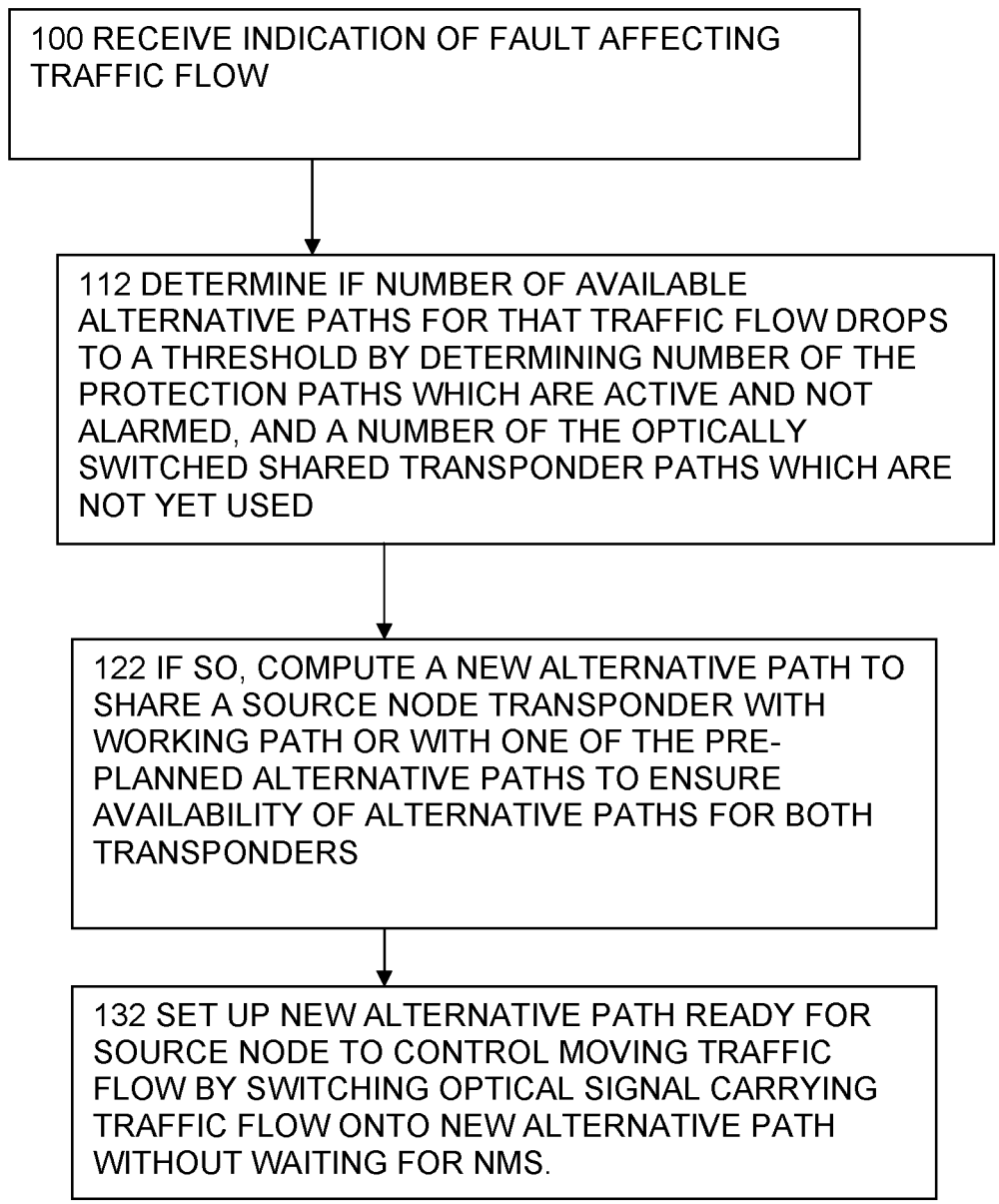
FIG. 8 shows some steps in another method of managing an optical network according to another embodiment.

FIG. 8, steps according to another embodiment

FIG. 8 shows steps similar to those of FIG. 2. At step 100, the NMS receives an indication of a fault affecting a traffic flow. The traffic flow typically has a working path and two or more alternative paths as before. It could be a fault in the working path or in principle, a fault in the alternative paths. At step 112, the NMS determines a number of alternative paths remaining available after the fault by determining a number of protection paths which are active and not alarmed, for the example of OSNCP schemes. The NMS can also determine for transponder sharing schemes a number of optically switched shared transponder paths which are not yet used. If the number drops to reach a threshold, then at step 122 a new alternative path is computed. The threshold should be at least one, which means that, with the new alternative path, there are always two available alternative paths. The new alternative path can be computed so as to share a source node transponder with working path or with one of the pre-planned alternative paths. This can help to ensure availability of alternative paths for both transponders, so that the availability of at least one alternative path is not dependent on the switching of the transponders. Typically this is automatic and not under the immediate control of the source node or the NMS, so as to provide a rapid response. At step 132, the new path is set up by sending messages to the source node, and it sends messages on to other nodes to control setting up the new alternative path.

Figure 9:
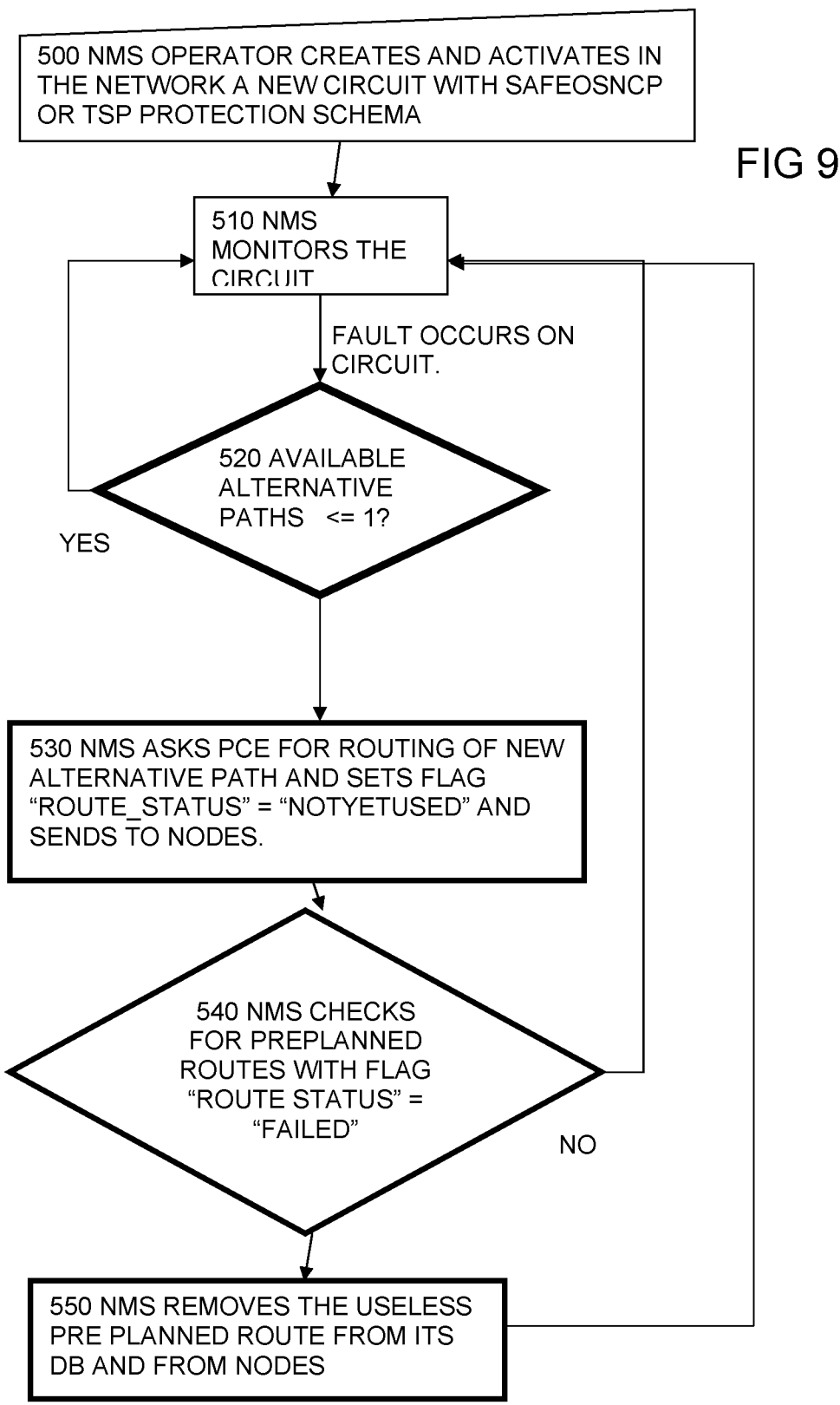
FIG. 9 shows some steps in another method of managing an optical network according to another embodiment.

FIG. 9, steps according to another embodiment

FIG. 9 shows some of the steps carried out by the NMS according to another embodiment to show when the new alternative path is calculated and also when any useless alternative paths are removed in order to free their resources.

The parts in "bold" are particular to or altered to suit the embodiment. Typically the nominal working path and the primary and secondary alternate paths for the SafeOSNCP scheme are never removed. Otherwise the steps can work both for TSP and Safe-OSNCP protection. Notably these steps take place dynamically during operation of the network though PCE is not overloaded as the path is calculated when the first fault occurs.

As shown in step 500 the NMS operator creates and activates in the network a new circuit for a traffic flow with a safe-OSNCP or TSP protection schema. At step 510, the NMS monitors the circuit. If a fault occurs on the circuit, at step 520 the NMS determines if a number of available alternative paths <=1. In determining a number of available alternative paths, "Available" can mean for example:

a. For Safe OSNCP: a protection route active and not alarmed
b. For TSP: a pre-planned route not yet used If no, then step 510 is repeated. If yes then at step 530 the NMS asks the PCE for routing of a new alternative path and sets a flag "route_status"="notyetused" and sends this to at least the source node.

At step 540 the NMS checks for preplanned routes with flag "route status"="failed", and at step 550 it removes any useless alternative paths from its database and from the nodes.

While the NMS is following these steps, the traffic flow can be moved in response to the fault as described above in relation to FIGS. 3 to 7.

Figure 10:
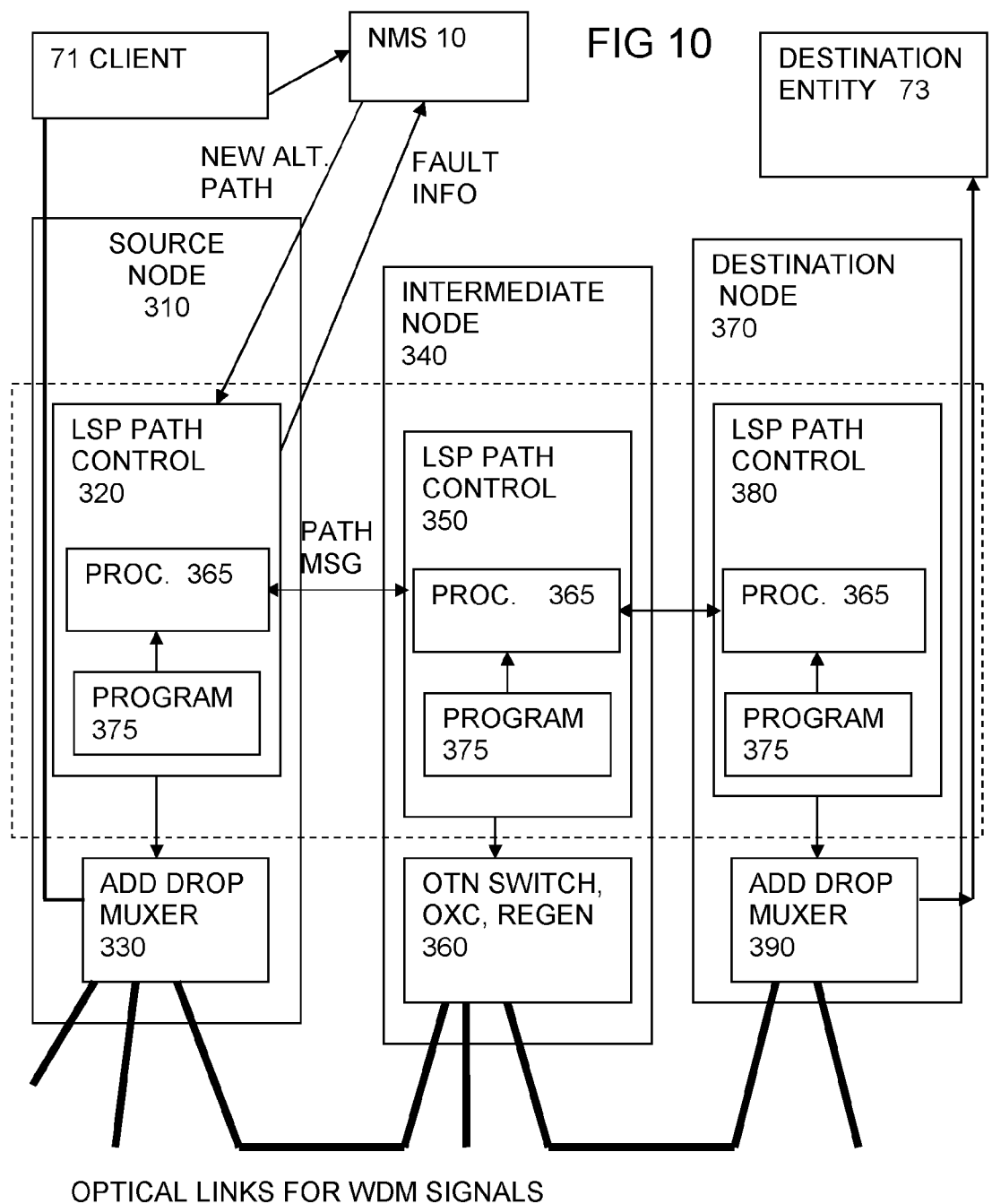
FIG. 10 shows a view of nodes along the new alternative path.

FIG. 10, network view

FIG. 10 shows a schematic view of nodes in an optical network showing parts used to exchange messages to advertise information or set up paths. Three nodes are shown, there can be many more. A client 71 is sending the traffic flow across the network. A source node 310 is coupled to insert the traffic flow from the client. The source node has an LSP path reservation control part 320, which controls an add drop multiplexer part 330. The reservation control part can have a processor 365 and a store having a program 375 for execution by the processor 365. The program can enable the node to act as a source node, or in some cases, to act as an intermediate node for other paths started elsewhere. An intermediate node 340 has its own LSP path reservation control part 350, which controls a part 360 which can be an OTN switch, an OXC, a ROADM or a REGEN or combinations of these for example. Again, the reservation control part can have a processor 365 and a store having a program 375 for execution by the processor 365. The program can enable the node to act as an intermediate node. If the intermediate node had add drop capabilities, then the program could be chosen to make the node act as a source or destination (egress) node for other paths. A destination node 370 has its own LSP path reservation control part 380, which controls it's add/drop multiplexer 390. Again, the reservation control part can have a processor 365 and a store having a program 375 for execution by the processor 365. The program can enable the node to act as a destination node for the path shown, or as a source or intermediate node for other paths. A client entity 71 requesting a path is shown, as a source of the traffic flow for which the new path is needed, through the network to a destination entity 73. An NMS 10 may have a path computation part and is coupled to receive a traffic request from the client. The path computed by the NMS is then fed to the source node 310 for setting up the path as described below in relation to FIG. 11.

If the path computation part is not in the ingress node, but is a remotely located part, optionally centralized to be used by many different nodes, then a communications protocol between the source of the traffic request and the path computation part may be needed. This protocol can indicate what information in what format is needed by the path computation part, and what information and what format is to be used for the output of the path list to the ingress node. RFC 4657 is a known example of such a protocol, for use with path computation parts corresponding to the known standard RFC 4655.

The processors of each node can pass messages to each other to advertise information to be used by the path computation server, as described above.

Optical links are shown for carrying the traffic between the nodes, and a connection is shown between the control parts of the nodes for passing messages to reserve the path. This connection can in principle use either the same or different physical links to those used by the traffic between nodes.

Figure 11:
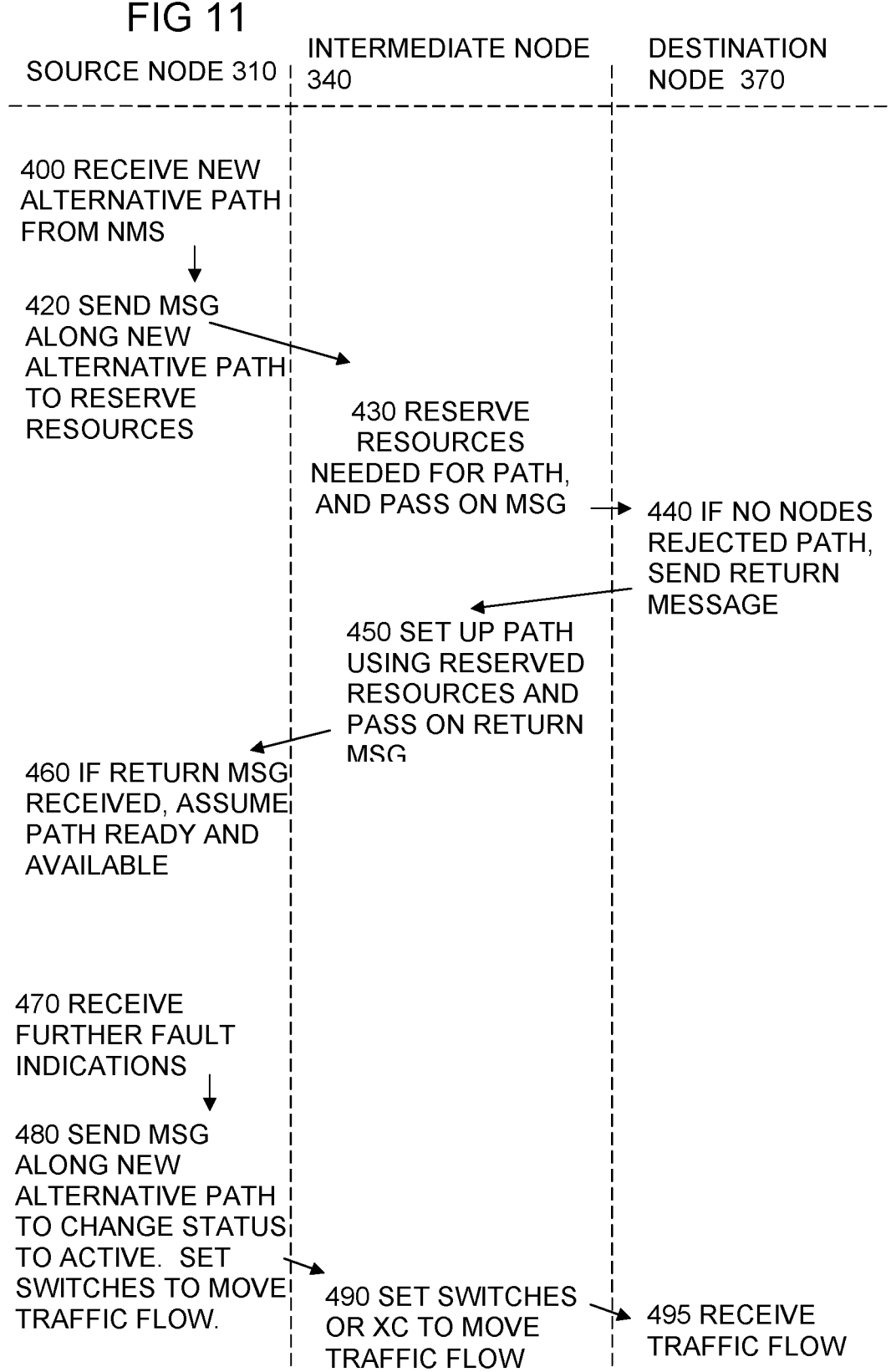
FIG. 11 shows a time chart of messaging between the nodes to set up the new alternative path.

FIG. 11, sequence chart

To explain an example of a path set up process for a new alternative path, an RSVP process will be described with reference to FIG. 11 which shows a time chart. A left hand column shows steps of the source node 310, a middle column shows steps of the intermediate node 340 and a right column shows steps of the destination node 370. Time flows down the chart. A first step 400 is the source node receiving a new alternative path from a network management system in the form of for example a path list of nodes, optionally a list of wavelength assignments and other information as needed such as regeneration locations. This may be taken as a request to reserve resources for the path at the nodes.

To reserve a path, an RSVP-TE (Traffic Engineering) PATH message, in the form of a Generalized Label Request, is sent out at step 420 from the source node (which acts as an ingress node) via intermediate nodes along the proposed path, to the destination node (acting as an egress node).

The intermediate node or nodes each reserve the resources needed for the path and pass the message on at step 430. The egress node returns an RSVP-TE RESV message to the ingress node at step 440 if no nodes have rejected the message, back along the path to cause the nodes along the path to confirm the reservation of resources such as bandwidth on switch paths and ports, for the requested path, for traffic of a signal type specified in the message. The intermediate node passes on this message and sets up the path using the reserved resources, but with an appropriate status to indicate no traffic is flowing on the path yet. If this return message is received at the source node, then the source node can assume the path is ready at step 460.

The Generalized Label Request is a message used by RSVP-TE for the signaling of a Label Switched Path (LSPs) on any kind of network technology. It is defined in RFC3471 and extended in RFC 4328 in order to support G.709 OTN architecture. It includes a common part (i.e., used for any switching technology) and a technology dependent part (i.e., the traffic parameters).

Figure 12:
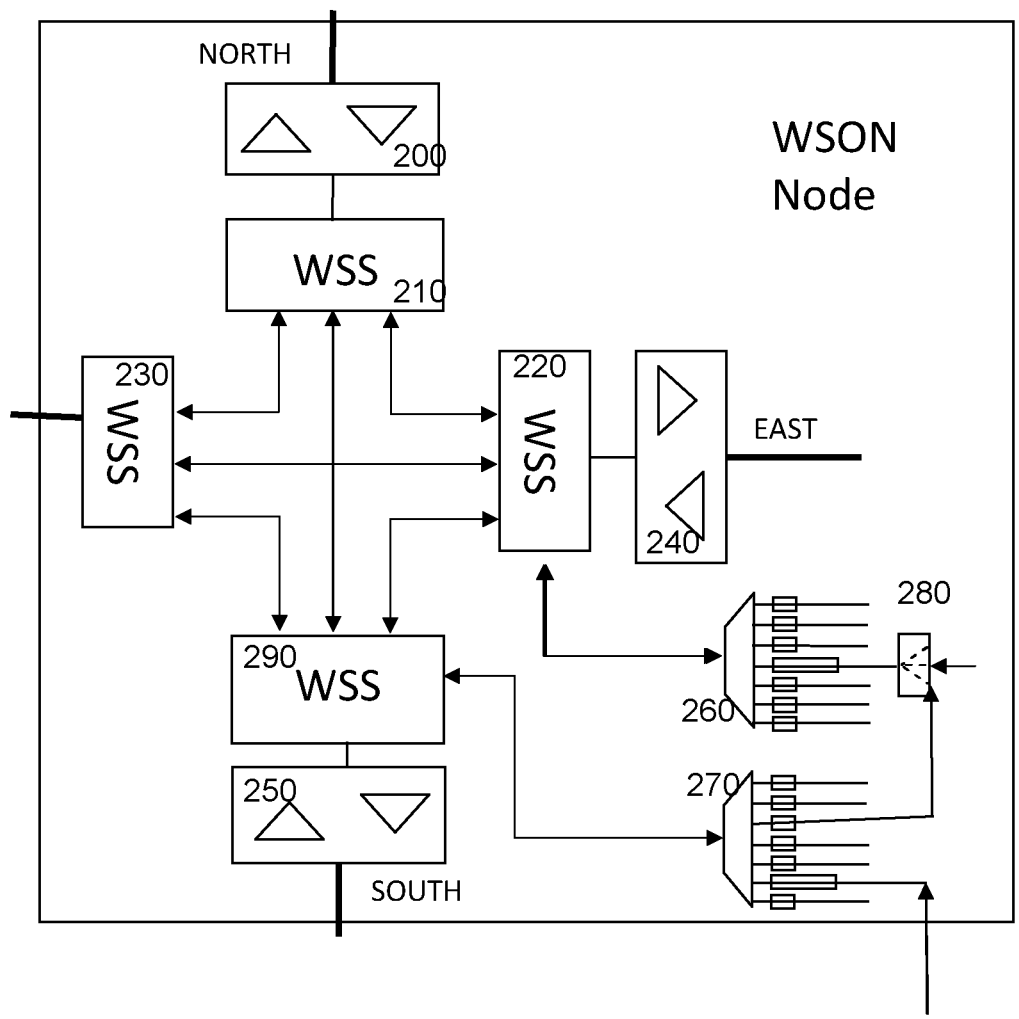
FIG. 12 shows an example of a WSON node.

FIG. 12, example of a wson node

FIG. 12 shows an example of an optical switch formed of a number of sections, wavelength switching sections WSS, 210, 220, 230, 290 each associated with one of the optical line ports. Each WSS has an input side and an output side. Optical line ports 200, 240, 250 are shown, which may have wavelength division multiplexing and de multiplexing parts. Any of the WSS parts can have an associated bank of transponders, two of these are shown, 260 for WSS 220, and 270 for WSS 290. These each handle a different wavelength and these wavelengths are multiplexed or bundled to reach the associated WSS where the individual wavelengths can be directed to different ones of the optical line ports. Optionally a single wavelength is selected from the bank of transponders to reach the WSS. In cases where all wavelengths are fed to the WSS, each of the transponders can be coupled to its own electrical selector. One electrical selector 280 is shown, coupled to enable an electrical output from one transponder to be fed back as an input to another transponder, to provide a regeneration capability. Other such regenerators are not shown for the sake of clarity. The regenerators can output the same wavelength or can act as wavelength converters and output a different wavelength. Again the WSS can be passive devices, in which case the direction taken by incoming wavelengths depends on the wavelength and so is controlled by the choice of, or tuning of, the transponders. If the WSS is an active device then the direction taken by a given wavelength can be selected by the PCE.

If the WSON node (such as a ROADM) includes wavelength converters, these are usually arranged into some type of pool to further enhance resource sharing and to allow a more flexible wavelength assignment.

An example of a connection is a 10 GB Ethernet connection. The transponders can be arranged as OTN framing devices to wrap this signal with OTN ODU2 framing signals, before sending it on a single wavelength. Other types of connection with other framing or without such framing can be envisaged.

Figure 13:
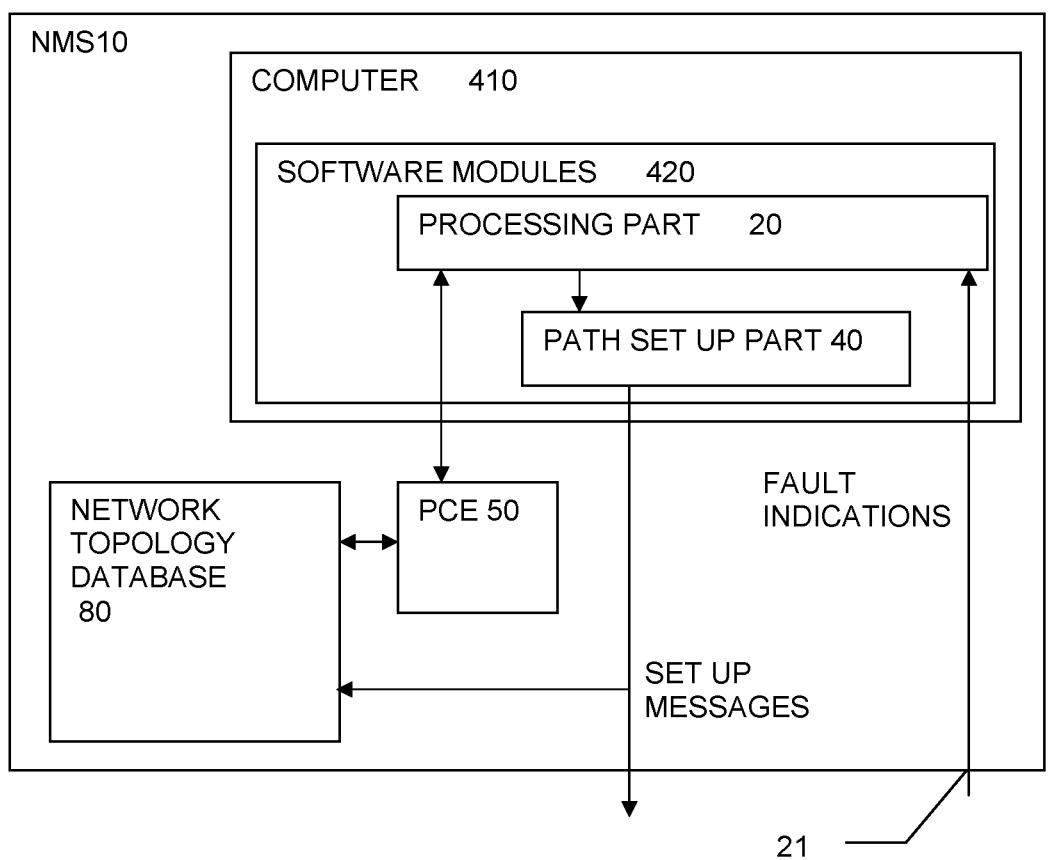
FIG. 13 shows another example of an NMS according to an embodiment.

FIG. 13, NMS according to another embodiment

FIG. 13 shows an embodiment similar to that of FIG. 1, except that the processing part and the path set up part are implemented by software modules arranged to run on a computer 410. Path computation can be carried out either dynamically by the control plane, or off line by an off line PCE which can be implemented in the form of a program running on a computer PC outside the network, and used either for path provisioning during network design before installation, or for determining how best to upgrade the network by providing new capacity. If the path computation is carried out externally to the source node, then the requesting entity or the source node needs to pass all the necessary information to the external part.

Consequences of some of the embodiments are as follows. Resource consumption (RC) is defined as:

$$RC = f(x1, x2)$$

where
x1=number of NE involved in the worker, protection and preplanned path
x2=NE memory used to store the pre planned cross connection
$RC_{OTF}$ is the RC for the classic On-The-fly approach.
$RC_{WSON}$ is the RC for the WSON 1.0 approach.
$RC_{invention}$ is the RC for an embodiment.

The embodiments help enable a reduction in x1 and x2 values in a significant way, which means:
Lower x1: resources are free and available to protect other circuit
Lower x2: NE memory is not wasted to store all the pre-planned paths (specially for TSP).
So one states that
$RC_{invention}$ is equivalent to $RC_{OTF}$
$RC_{invention} \ll RC_{WSON}$ Moreover if T is defined as the time needed to establish the new protection route, $$T = f(y1, y2)$$

where
y1=PCE computation time
y2=Network Element configuration set-up time
$T_{OTF}$ is the RC for the classic On-The-fly approach
$T_{WSON}$ is the RC for the WSON 1.0 approach
$T_{invention}$ is the RC for our invention The embodiments can help enable a reduction in y1 and y2 values in a significant way, which means
Lower y1: the protection route is known to the NE
Lower y2: due to y1, the laser tuning can start before
So one can state that
$T_{invention}$ is equivalent to $T_{WSON}$
$T_{invention} \ll T_{OTF}$ Moreover, in case of NMS unavailability, it takes some time to start NMS software on another machine (it depends on the high availability solution adopted). During this time a fault can happen on the last route available and the traffic is lost with a classical OTF approach. With the embodiments, the NE is able to react to the fault and when the NMS is again available it will calculate a new route. We define this aspect as NR (Network Reliability). In addition this can be considered an extension to any Fault handling State Machine and for that reason it is applicable to equipment from any vendor.

The invention claimed is:

1. A network management system for managing pre-planned alternative paths in a wavelength switched optical network having a number of nodes and the network management system having:
   an input for receiving an indication of a fault affecting a traffic flow, the traffic flow having a working path and two or more pre-planned alternative paths from a source node to a destination node,
   a processing part arranged to determine if, after the fault, a number of available alternative paths for the respective traffic flow drops to a threshold, the threshold being at least one, and if so, to determine a new alternative path through the network for the respective traffic flow from the same source node to the same destination node, and
   a path set up part arranged to communicate with the nodes along the new alternative path to set up the new alternative path in the nodes, to enable one or more of the nodes to move the traffic flow onto the new alternative path in the event of further faults without waiting for input from the network management system.

2. The network management system of claim 1, the pre-planned alternative paths comprising any one or more of optically switched shared transponder paths and electrically switched automatic protection paths, and the determination of the number of available alternative paths comprises determination of a number of the protection paths which are active and not alarmed, and a number of the optically switched shared transponder paths which are not yet used.

3. The network management system of claim 1, at least one of the pre-planned alternative paths adapted to use of a different transponder at the source node to that used by the working path, and the processing part being arranged to determine whether the new alternative path shares the transponder used by the working path or shares the different transponder, so as to provide available alternative paths using two or more different transponders.

4. The network management system of claim 1, the threshold being one.

5. The network management system of claim 1, having an internal path computation element for carrying out the determining of the new alternative path.

6. The network management system of claim 1, being centralized at a single location.

7. The network management system of claim 1, the path set up part being arranged to set up the new alternative path so that the movement of the traffic flow onto the new alternative path is left under control of the source node, by means of optical switches at nodes along the path where the new alternative path respectively diverges from, and rejoins, a path previously carrying the traffic flow.

8. The network management system of claim 1, the path set up part being arranged to cause the nodes to remove an existing alternative path if it is no longer available, to free the resources reserved for that path.

9. The network management system of claim 1, at least some of the nodes having a wavelength conversion capability, and the determination of the new alternative path involving the assignment of a different wavelength for some or all of the path compared to wavelengths used for the pre-planned alternative paths.

10. A method of managing pre-planned alternative paths in a wavelength switched optical network having a number of nodes, the method having the steps of:

receiving an indication of a fault affecting a traffic flow, the traffic flow having a working path and a number of pre-planned alternative paths from a source node to a destination node, determining if a number of available pre-planned alternative paths for the respective traffic flow drops to a threshold, the threshold being at least one, if the threshold is reached, determining a new alternative path through the nodes of the network for the respective traffic flow from the same source node to the same destination node, and setting up the new alternative path in the nodes, to enable one or more of them to move the traffic flow onto the new alternative path in the event of further faults.

11. The method of claim 10, the pre-planned alternative paths comprising any one or more of optically switched shared transponder paths and electrically switched automatic protection paths, and the determining of the number of available alternative paths comprises determining a number of the protection paths which are active and not alarmed, and a number of the optically switched shared transponder paths which are not yet used.

12. The method of claim 10, at least one of the pre-planned alternative paths making use of a different transponder at the source node to that used by the working path, and the step of determining the new alternative path comprises determining whether to share the transponder used by the working path or to share the different transponder, so as to provide available alternative paths using two or more different transponders.

13. The method of claim 10, the threshold being one.

14. The method of claim 10, the step of determining the new alternative path comprising causing an external path computation element to compute the new alternative path from a source node to a destination node.

15. The method of claim 10, the setting up step comprising setting up the new alternative path so that the moving of the traffic flow onto the new alternative path is left under control of the source node, by means of optical switches at nodes along the path where the new alternative path respectively diverges from, and rejoins, a path previously carrying the traffic flow.

16. The method of claim 10, the path set up step comprising reserving resources at the nodes and setting a route status as not used.

17. The method of claim 10, having the step of causing the nodes to remove an existing alternative path if it is no longer available, to free the resources reserved for that path.

18. A non-transitory computer readable storage medium storing instructions for managing pre-planned alternative paths in a wavelength switched optical network having a number of nodes, the instructions when executed by a set of processors cause the set of processors to:

receive an indication of a fault affecting a traffic flow, the traffic flow having a working path and a number of pre-planned alternative paths from a source node to a destination node;

determine if a number of available pre-planned alternative paths for the respective traffic flow drops to a threshold, the threshold being at least one;

if the threshold is reached, determine a new alternative path through the nodes of the network for the respective traffic flow from the same source node to the same destination node; and set up the new alternative path in the nodes, to enable one or more of them to move the traffic flow onto the new alternative path in the event of further faults.

19. The non-transitory computer readable storage medium of claim 18, the pre-planned alternative paths comprising any one or more of optically switched shared transponder paths and electrically switched automatic protection paths; and the instructions that cause determining of the number of available alternative paths further comprise instructions that when executed by a set of processors cause determining a number of the protection paths which are active and not alarmed, and a number of the optically switched shared transponder paths which are not yet used.

20. The non-transitory computer readable storage medium of claim 18, at least one of the pre-planned alternative paths making use of a different transponder at the source node to that used by the working path, and the instructions that cause determining the new alternative path further comprise instructions that when executed by a set of processors cause the set of processors to determine whether to share the transponder used by the working path or to share the different transponder, so as to provide available alternative paths using two or more different transponders.

21. The non-transitory computer readable storage medium of claim 18, the threshold being one.

22. The non-transitory computer readable storage medium of claim 18, the instructions that cause determining the new alternative path further comprising instructions that when executed by a set of processors cause an external path computation element to compute the new alternative path from a source node to a destination node.

23. The non-transitory computer readable storage medium of claim 18, the instructions that cause setting up further comprising instructions that when executed by a set of processors cause setting up the new alternative path so that the moving of the traffic flow onto the new alternative path is left under control of the source node, by means of optical switches at nodes along the path where the new alternative path respectively diverges from, and rejoins, a path previously carrying the traffic flow.

24. The non-transitory computer readable storage medium of claim 18, the instructions that cause path set up further comprising instructions that when executed by a set of processors cause reserving resources at the nodes and setting a route status as not used.

25. The non-transitory computer readable storage medium of claim 18, further storing instructions that when executed by a set of processors cause the nodes to remove an existing alternative path if it is no longer available, to free the resources reserved for that path.

* * * * *